United States Patent
Shevlin

(10) Patent No.: US 9,587,403 B2
(45) Date of Patent: Mar. 7, 2017

(54) FIXTURE SUPPORT FOR MEMBRANE ROOF

(71) Applicant: William Edwin Shevlin, Santa Cruz, CA (US)

(72) Inventor: William Edwin Shevlin, Santa Cruz, CA (US)

(73) Assignee: Platinum Roofing, Inc., San Jose, CA (US)

(*) Notice: Subject to any disclaimer, the term of this patent is extended or adjusted under 35 U.S.C. 154(b) by 0 days.

(21) Appl. No.: 15/196,498

(22) Filed: Jun. 29, 2016

(65) Prior Publication Data

US 2016/0319548 A1 Nov. 3, 2016

Related U.S. Application Data

(60) Continuation-in-part of application No. 14/974,266, filed on Dec. 18, 2015, now Pat. No. 9,416,541, (Continued)

(51) Int. Cl.

| | |
|---|---|
| *E04B 1/00* | (2006.01) |
| *E04G 21/00* | (2006.01) |
| *E04G 23/00* | (2006.01) |
| *E04D 13/00* | (2006.01) |
| *E04D 5/06* | (2006.01) |
| *E04D 5/14* | (2006.01) |
| *F24H 9/18* | (2006.01) |

(Continued)

(52) U.S. Cl.
CPC ............... *E04D 13/00* (2013.01); *E04D 5/06* (2013.01); *E04D 5/149* (2013.01); *E04D 1/34* (2013.01); *E04D 5/144* (2013.01); *F24F 13/32* (2013.01); *F24H 9/06* (2013.01); *F24H 9/122* (2013.01); *F24H 9/18* (2013.01); *F24H 9/1809* (2013.01); *F24H 9/2007* (2013.01)

(58) Field of Classification Search
CPC .. F24F 13/32; F24H 9/122; F24H 9/06; F24H 9/18; F24H 9/1809; F24H 9/2007; E04D 5/149; E04D 5/144; E04D 13/00; E04D 1/34
USPC ....... 52/25, 27, 746.11, 741.15, 745.21, 698, 52/741.1; 248/237, 200
See application file for complete search history.

(56) References Cited

U.S. PATENT DOCUMENTS

| | | | | |
|---|---|---|---|---|
| 6,360,491 B1 * | 3/2002 | Ullman | ................... | E04D 13/12 248/156 |
| 6,634,615 B1 * | 10/2003 | Bick | ........................ | H02B 1/54 248/499 |

(Continued)

*Primary Examiner* — Chi Q Nguyen
(74) *Attorney, Agent, or Firm* — Donald R. Boys; Central Coast Patent Agency, Inc.

(57) ABSTRACT

A method for mounting an appliance to a membrane-covered roof involves (a) mounting two or more rails or appendages to the appliance, the rails or appendages placed to lie flat on the membrane-covered roof, supporting the appliance, and to extend away from the appliance, (b) installing two reinforced attachments, each incorporating a metal plate fastened into decking below the membrane of the membrane-covered roof, and covered by transition membrane heat welded to the membrane of the membrane-covered roof, one attachment installed on each side of each rail to be secured to the roof; and (c) fastening a bridge between the two attachments and over the rail at each rail point to be secured to the roof.

4 Claims, 17 Drawing Sheets

Related U.S. Application Data which is a division of application No. 14/264,331, filed on Apr. 29, 2014, now Pat. No. 9,238,914.

(51) Int. Cl.
| | |
|---|---|
| *F24H 9/12* | (2006.01) |
| *F24H 9/06* | (2006.01) |
| *F24F 13/32* | (2006.01) |
| *F24H 9/20* | (2006.01) |
| *E04D 1/34* | (2006.01) |

(56) References Cited

U.S. PATENT DOCUMENTS

| | | | |
|---|---|---|---|
| 8,763,321 B1* | 7/2014 | Clemens | H02S 20/23 248/237 |
| 2003/0041554 A1* | 3/2003 | Hughes | F24H 1/206 52/741.1 |
| 2003/0123863 A1* | 7/2003 | Hughes | F24H 1/206 392/449 |
| 2003/0177706 A1* | 9/2003 | Ullman | E04D 13/12 52/3 |
| 2012/0042597 A1* | 2/2012 | Ray | E04D 3/3608 52/582.1 |
| 2012/0124933 A1* | 5/2012 | Baruh | E04G 21/122 52/719 |
| 2013/0091479 A1* | 4/2013 | Salem | G06F 17/5081 716/112 |
| 2013/0186017 A1* | 7/2013 | Kassem | F24J 2/5205 52/173.3 |
| 2015/0033658 A1* | 2/2015 | West | F24J 2/5211 52/582.2 |
| 2015/0249423 A1* | 9/2015 | Braunstein | H02S 20/23 52/173.3 |

* cited by examiner

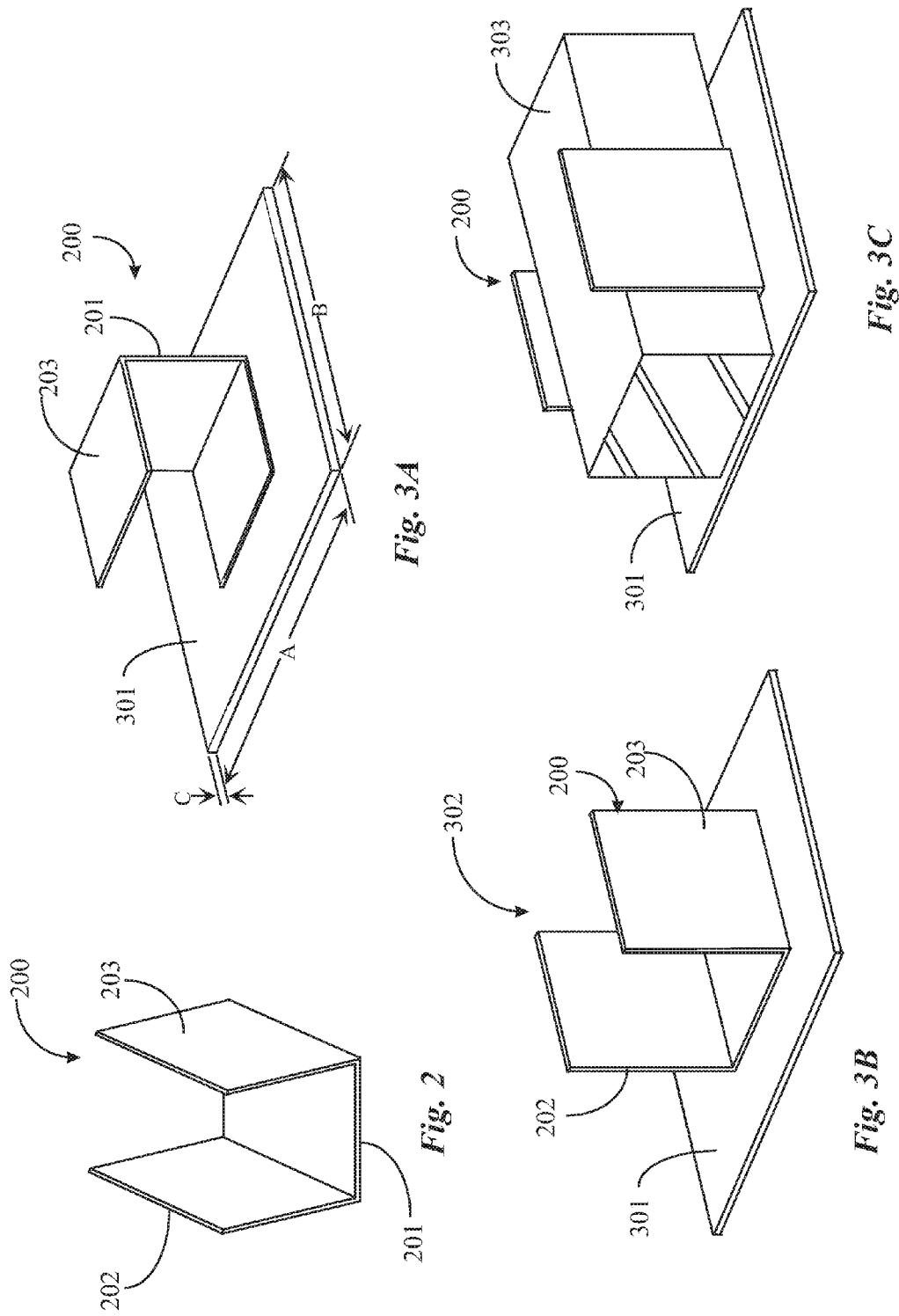

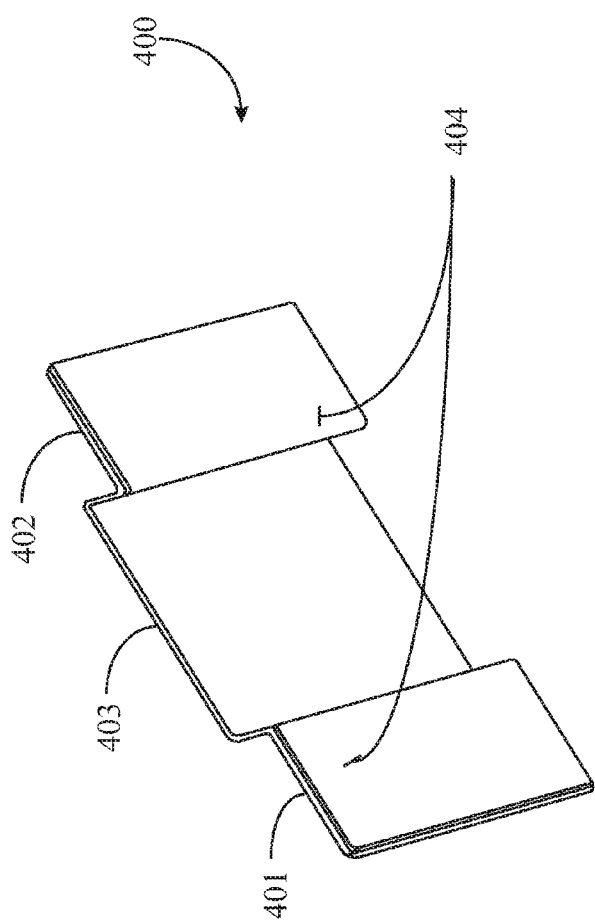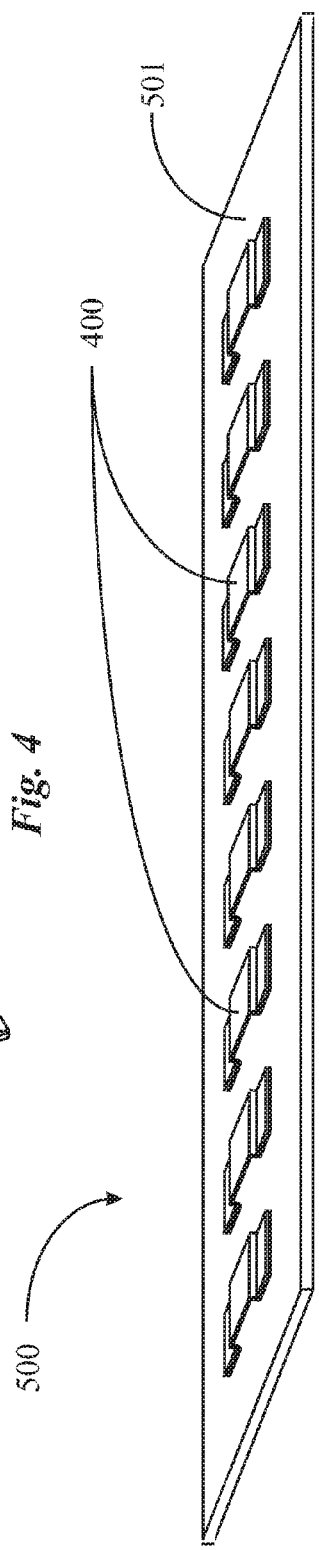
Fig. 4
Fig. 5

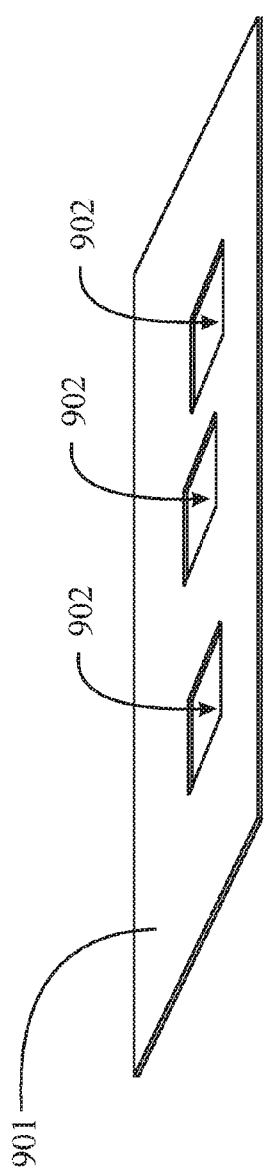
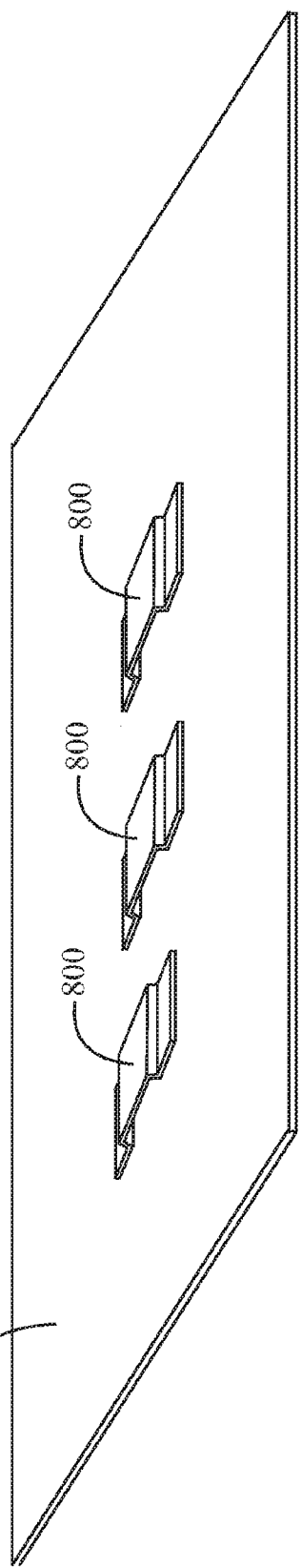

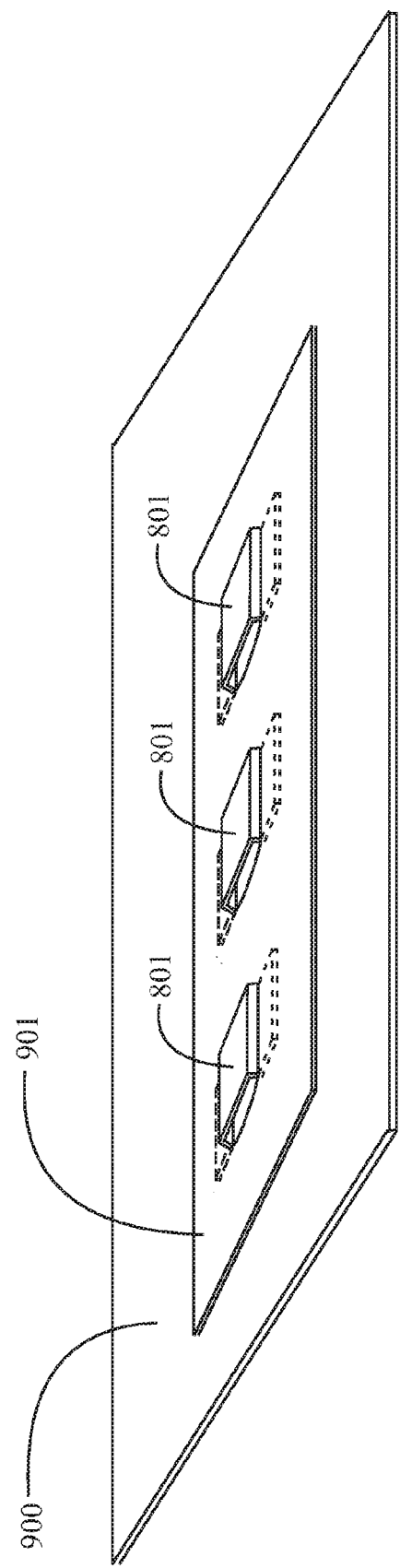

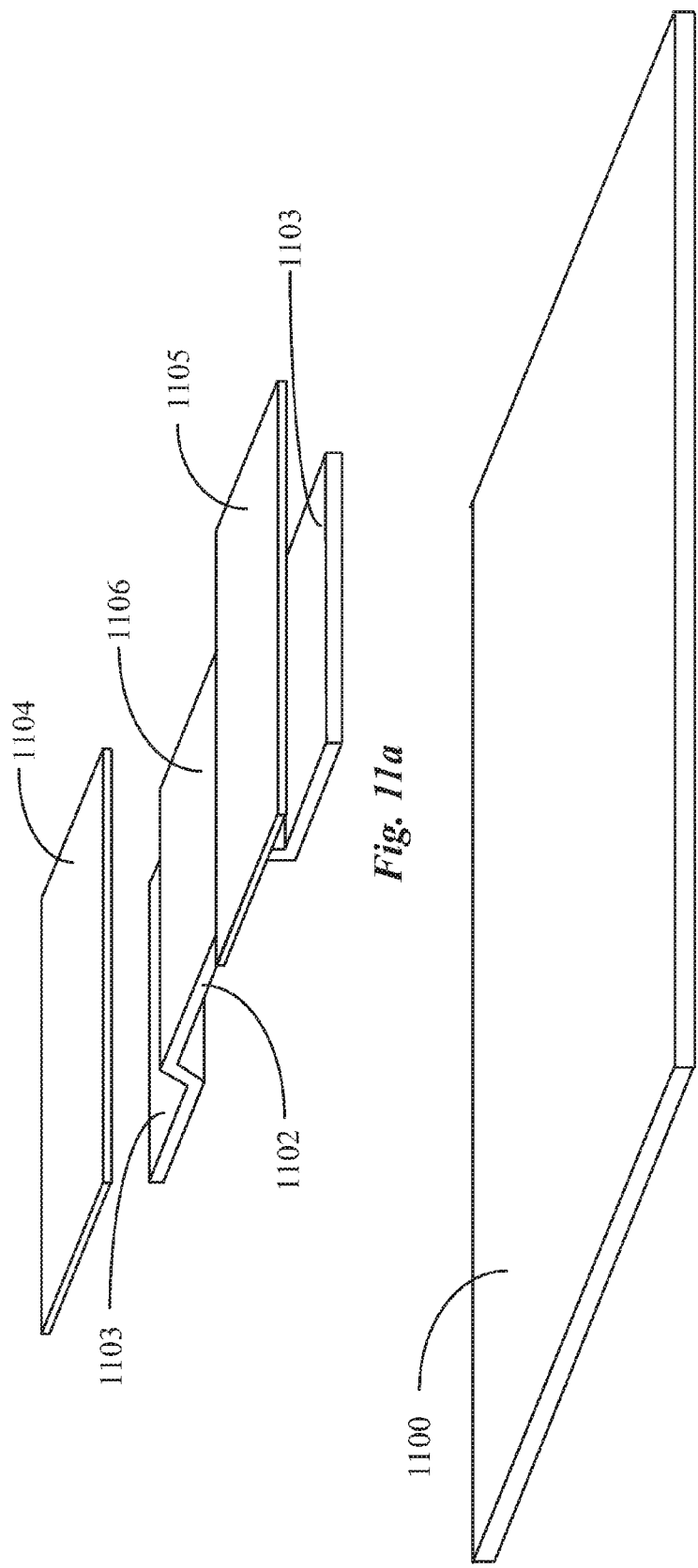

FIXTURE SUPPORT FOR MEMBRANE ROOF

CROSS-REFERENCE TO RELATED DOCUMENTS

The present application is a continuation-in-part application to pending application Ser. No. 14/974,266, filed on Dec. 18, 2015, and issued as U.S. Pat. No. 9,416,541 on Aug. 16, 2016, which is a divisional application of Ser. No. 14/264,331, filed Apr. 29, 2014 and issued as U.S. Pat. No. 9,238,914 on Jan. 19, 2016. All disclosure of the prior applications is incorporated herein at least by reference.

BACKGROUND OF THE INVENTION

1. Field of the Invention

The present invention is in the field of construction and pertains particularly to methods and apparatus for supporting fixtures on a membrane roof.

2. Discussion of the State of the Art

In the field of construction, particularly roofing, membrane roofing as it is known in the art is becoming a staple for certain roof systems that formerly would be covered in asphalt and or roof tar. Membrane roofing panels are typically available in sheets or rolls that may be cut to length and that may be secured to an unfinished roof surface, and heat welded together to form a unitary membrane.

Although there are a variety of membrane roofing materials available, more common compositions include Polyvinyl Chloride (PVC), Ketone Ethylene Ester (KEE), Chloro-Sulfonated Polyethylene (CSPE), Ethylene Propylene Diene Monomer(EPDM) and Thermoplastic PolyOlefin (TPO). Membrane roofing sheets may be mechanically fastened through the membrane with a screw, pin type fastener or other mechanical means un-finished roof with an overlapping edge of an adjacent sheet heat welded over the fastened line to cover and seal the fastener. Membrane roofs can also be adhered using a variety of adhesives by applying adhesive to the existing roof substrate, insulation, fire proof roof board or unfinished roof substrate. The exposed seams of the membrane are then heat welded to create a solid membrane out of the panels or rolls. Heat welding the panels together involves a surface-to-surface heating and fusion of the interfacing surfaces of adjacent panels or sheets, requiring a certain minimum temperature.

Membrane panels or sheets may be custom fabricated and may be offered in standard sizes. The material resiliency including flexibility may be designed into the product through varying the percentage of certain materials in the composite such as different percentages of rubber added to the composite.

Installing fixtures such as pipe brackets, solar panels, roof vents, air-conditioners, and other like accessories can be problematic after a membrane roof is installed, in that support structures designed to hold the fixtures in place are conventionally nailed or otherwise fastened to the roof over the membrane material, penetrating the membrane material at each anchor point. Although the penetrations may be small, nonetheless, roofing mastic, caulking, sealants, or a similar semi-viscous sealer is applied over the penetrations to seal them ensuring a leak proof or watertight roof system.

It has occurred to the inventor that such penetrations, although minor, have a collective negative effect on the long-term viability of the roofing system in protection against leakage. For example, roofing mastic, caulking, sealants, roof putty or other after-market sealers do not last as long as the membrane materials of the roof systems and therefore periodic reapplication of such sealing products is often required to preserve the integrity of the system, or leaks are sure to occur. Many roof manufacturers provide leak free warrantees that cover labor and materials up to 30 years. Penetrations directly into the roof membrane can in certain instances void these warrantees.

Therefore, what is clearly needed is an apparatus for supporting fixtures on a membrane roof that altogether eliminates the need for penetrating the membrane roofing material.

BRIEF SUMMARY OF THE INVENTION

In one embodiment of the invention a method for mounting an appliance to a membrane-covered roof is provided, comprising (a) mounting two or more rails or appendages to the appliance, the rails or appendages placed to lie flat on the membrane-covered roof, supporting the appliance, and to extend away from the appliance, (b) installing two reinforced attachments, each incorporating a metal plate fastened into decking below the membrane of the membrane-covered roof, and covered by transition membrane heat welded to the membrane of the membrane-covered roof, one attachment installed on each side of each rail to be secured to the roof, and (c) fastening a bridge between the two attachments and over the rail at each rail point to be secured to the roof.

In one embodiment the rails or appendages are metal rails. In one embodiment the bridge is formed of metal fastened to brackets at each of the attachment points. And in one embodiment the bridge is formed of strips of membrane material.

BRIEF DESCRIPTION OF THE SEVERAL VIEWS OF THE DRAWINGS

FIG. 2 is a perspective view of a fixture bracket with a membrane coating on an interfacing surface.

FIG. 3A is a perspective view of the bracket of FIG. 2 heat welded to a piece of membrane material at a first side.

FIG. 3B is a perspective view of the bracket of FIG. 2 heat welded to a piece of membrane material at a second side.

FIG. 3C is a perspective view of the bracket of FIG. 2 welded as in FIG. 3B having a wooden element held in the bracket.

FIG. 4 is a perspective view of a fixture bracket with membrane coatings on two interfacing surfaces.

FIG. 5 is a perspective view of an array of the fixture brackets of FIG. 4 heat welded to a piece of membrane material.

FIG. 9a is a perspective view of a transition membrane in an embodiment of the invention.

FIG. 9b is a perspective view of three brackets in a pattern.

FIG. 10 is a perspective view of the elements of FIGS. 9a and 9b joined in an embodiment of the invention.

FIG. 11a is a perspective view of a bracket and transition membranes in an embodiment of the invention.

FIG. 11b is a perspective view of a roof membrane in an embodiment of the invention.

DETAILED DESCRIPTION OF THE INVENTION

In various embodiments described in enabling detail herein, the inventor provides a unique apparatus and methods for supporting fixtures and utilities on a membrane roof system. The present invention is described using the following examples, which may describe more than one relevant embodiment falling within the scope of the invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented within the scope of the invention. The invention is limited only by the breadth of the claims below.

Figure 1:
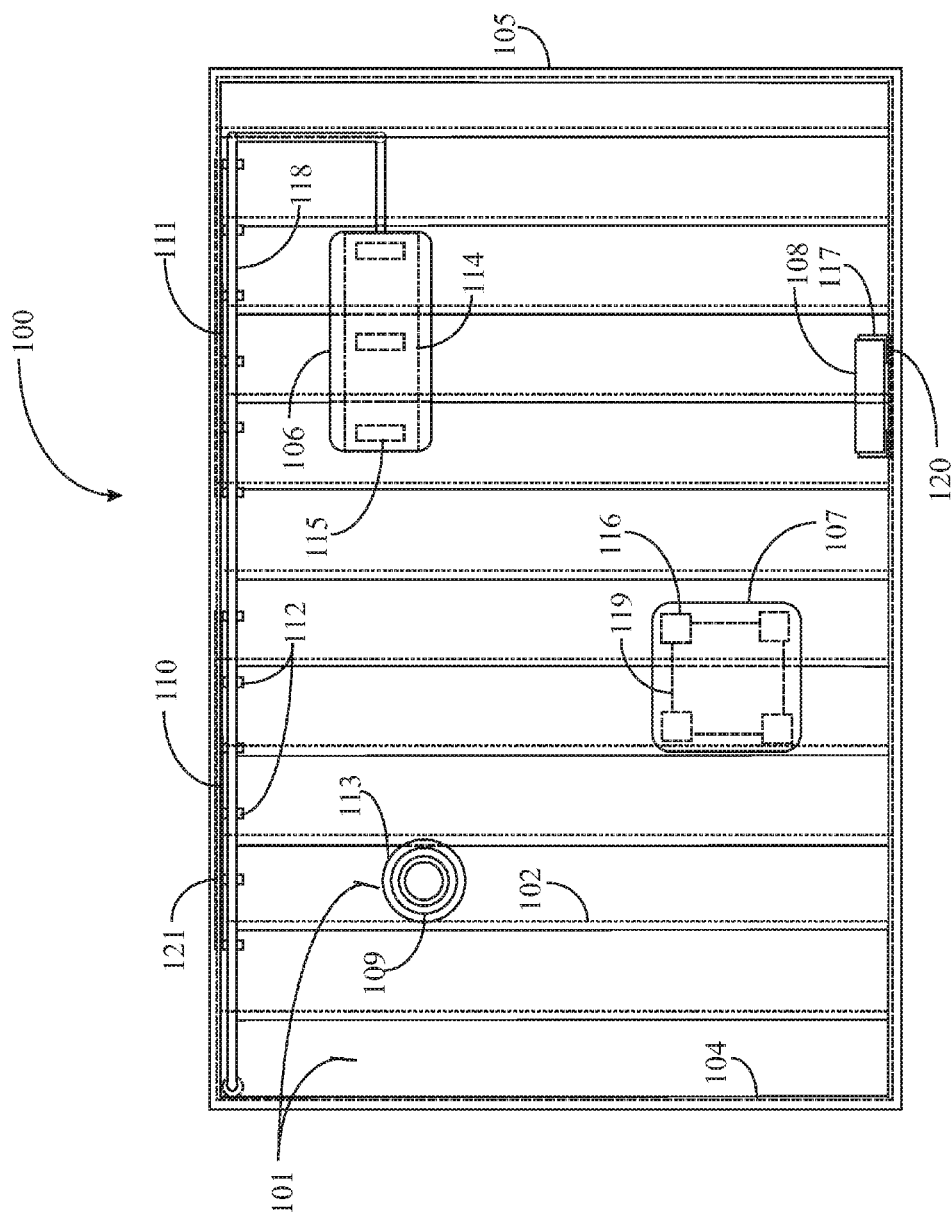
FIG. 1 is an overhead view of a membrane roof system supporting fixture installation according to an embodiment of the present invention.

FIG. 1 is an overhead view of a membrane roof system 100 supporting fixture installation according to an embodiment of the present invention. Roof system 100 may be formed of one of Polyvinyl Chloride (PVC), Ketone Ethylene Ester (KEE), Chloro-Sulfonated Polyethylene (CSPE), Ethylene Propylene Diene Monomer(EPDM) or Thermoplastic PolyOlefin (TPO) without departing from the spirit and scope of the present invention, or any other membrane material known in the art. Roof system 100 is laid over an unfinished roof surface using precut flexible roofing sheets 101.

The term membrane roughly refers to a flexible resilient roof made with a mixture of rubber and thermoplastic polymers. Such materials may be heat welded together to fuse the roofing sheets together presenting a leak proof covering. An important material in membrane roofing is thermoplastic PolyOlefin (TPO) in this example, however the present invention does not strictly depend on TPO for successful application. Therefore, other flexible or membrane type roofing materials may also be considered for heat weld such as Polyvinyl Chloride (PVC), Ketone Ethylene Ester (KEE), Chloro-Sulfonated Polyethylene (CSPE), or Ethylene Propylene Diene Monomer(EPDM).

Roofing sheets 101 are rolled out lengthwise and fastened (one edge) to the roof surface with subsequent sheets laid over the previous sheets to cover the fastening lines. The overlapping area of a sheet of membrane is heat welded over the fastening line (102) on the previous sheet installed to ensure watertight seal. In this example roof system 100 has a horizontal surface (floor) and four vertical surfaces (walls). Typically, wall or vertical covering is performed with the same material as the horizontal covering and wall sheets have adjacent edges overlapping and heat welded over the fastening lines of the edge panels or sheets on the horizontal surface or floor of the roof.

Roof system 100 in this example includes a number of fixtures that are installed and supported on both the horizontal roof surface and on at least two of the vertical surfaces. It is noted that a roof construction that may accept a membrane roof system may incorporate hips and valleys, sloped surfaces and non-flat surfaces, and other features without departing from the spirit and scope of the present invention. The apparatus may support fixtures installed on any of the surfaces of the roof.

In this example a fixture 107 is depicted on the horizontal roof surface after finishing (covering). Fixture 107 may be a heating/air conditioning unit for example. A fixture 106 is also depicted on the horizontal roof surface. Fixture 106 might be a solar system for providing electricity or for heating a pool, etc. A fixture 109 is depicted herein as a vent or flue. A fixture 108 is depicted as mounted on a vertical roof surface and might represent a fire extinguisher, an alarm, or some other utility. The opposing vertical roof surface supports fixture 118. Fixture 118 may be conduit, plumbing, cabling, etc. There are a great variety of such fixtures that may be necessary on a roof.

The fixtures in this example are held in place by one or more brackets. Brackets may be manufactured of galvanized steel (sheet metal) or other durable metals or suitable materials. Such brackets may be custom built for the type of fixture being mounted. In one example a support apparatus includes more than one bracket.

It may be desired to determine and mark areas on the roof where fixtures will be installed before laying out the membrane roofing materials over the unfinished roof. In this case it may be desired to provide extra support for some fixtures that are particularly heavy or may need extra support, such as on a vertical or sloped roof surface. In one embodiment such areas are marked and one or more pieces of roofing material are cut and fastened to the unfinished roof to provide underlying enhancement of adhesion to a roof before laying out the roofing sheets 101.

In this example a cut piece of roofing membrane material 119 is provided and stapled or otherwise secured directly to unfinished roof beneath where an A/C system (107) will later be installed. Sheets 101 are heat welded (overlapping bottom surfaces) to support piece 119 (top surface) as the membrane roof is installed. Locations 116 are locations for unique bracket assemblies that are fastened to the membrane roof as described in more detail below.

In this example there is another fixture 106 depicted as supported on roof system 100. Fixture 106 may be a solar power panel used to provide extra electricity or for heating pool water for example. Underneath roofing sheets 101 there is a cut piece of support membrane 114. As discussed above, this piece is directly attached to the unfinished roof with screw fastener or other fastening techniques in a marked location. Roofing sheets 101 are heat welded over the support pad (114) and overlapping areas of the sheets are heat welded together. Screw fastener may not be used in areas where the roofing sheet overlays a precut piece of membrane used as a base or pad. Instead the sheeting may be heat welded to the support piece so there are no penetrations to the exposed materials. Areas 115 are positions for unique brackets described below in another embodiment of the invention.

Fixture 106 has a conduit or pipe 118 connected to it. This conduit represents a water pipe, electrical conduit, or any other required tethering for successful operation of the fixture. Conduit 118 is supported partly on a vertical side of roofing system 100. In this case pre-assembled pieces 121 and 111 are attached to the unfinished roof surface as previously described. Then roofing sheets (vertical 104) are overlaid and heat welded to pieces 121 and 111. Bracket supporting strips 110 represent precut membrane strips that may host an array of brackets heat welded at strategic locations along the strip, as described in further detail below. In this case brackets 112 are vertically mounted conduit hangars of the appropriate dimension to support the diameter of the supported conduit 118.

Fixture 108 is also vertically mounted, the apparatus including fixture 108 installed on brackets 117 that are heat welded to membrane support piece 120. In this case there is no underlying support piece attached to the roof surface. Strip 117 with brackets 117 previously heat welded on to it is subsequently heat welded to the finished roof membrane surface after the roof is covered. In this case the fixture may be installed anywhere, as there was no pre-determined location on the unfinished roof marked to denote a location for the fixture. Similarly, vent fixture 109 may be coated on an interfacing flange and then heat welded to a support ring that is then heat welded to the top surface of the finished roof. If additional support is needed another support piece may be stapled or otherwise attached to the unfinished roof at the location or the vent. The overlying material is then heat welded to the support piece while the flange piece welded to the top support piece is then welded to the finished surface.

In this way all of the fixtures that need to be installed on a membrane roofing system may be secured without leaving any penetrations through the finished membrane roof. The exact cut sizes of support pieces and whether additional support pieces (underlying and surface) are required depend upon the fixture type, location of the fixture (horizontally or vertically mounted), the weight of the fixture, and the composition of the membrane materials used as support pieces. The mixture of the composite relative to the percentages of rubber, plastic, binders, and other materials may contribute to less or more resiliency and flexibility of the roofing material. For larger fixtures like utilities that have more weight, additional support membrane pieces may be provided and fixture location on the roof may be pre-designed. For lightweight fixtures such as conduit fixtures, light fixtures, etc., only a single support membrane piece might be required. In this case the fixture brackets are heat welded to the support piece, which is in turn heat welded over the finished roof surface.

FIG. 2 is a perspective view of a fixture bracket 200 with a heat weldable coating on an interfacing surface. Bracket 200 may be a standard sheet metal bracket such as a galvanized steel bracket sheared and bent to design for the type of fixture to be held in place. In this example, bracket 200 is a U-shaped bracket having a side 201, a side 202, and a side 203, and sized to fit standard 4×4 lumber. Other brackets may be made for other standard sizes of lumber, or other pieces of support structure. The thickness of bracket 200 might vary, however one sixteenth of an inch to one eight of an inch may be sufficient thickness for such brackets.

Bracket 200 has a coating 204 covering an outside surface of wall 203. An interfacing surface refers to the surface that will interface and be heat welded to a support piece of roof material. It is important to note that the requirement of heat welding is that the coating is thick enough to be heat welded to the surface of the support piece wherein the materials fuse to form a contiguous bond. Coating 204 may be relatively thin compared to the thickness of a support piece of roof material. The exact thickness of the bracket coating may vary depending upon the thickness of the roofing material. Also, it is noted that the two materials (sheeting) and (coating) must be compatible for a contiguous heat weld application. In one embodiment both the coating and the roofing material is thermoplastic olefin (TPO). In embodiments of the invention brackets are formed from commercially-available galvanized sheets already coated on one side with TPO or one of the other formulations mentioned above, depending on the formulation of the membrane used for the roof on which the brackets may be attached.

FIG. 3A is a perspective view of bracket 200 of FIG. 2 heat welded to a piece of membrane material 301. Support piece 301 may be precut from roofing sheet material. In this configuration there is only a single bracket welded to a precut piece of roofing material. In other embodiments there may be an array of brackets heat welded to a single piece of membrane material. The length A and width B of piece 301 may vary according to fixture and bracket number requirements. Bracket 200 is shown heat welded to membrane piece 301 alongside 203, but may as well be heat welded alongside 201, facing open upward to receive a 4×4 beam, as shown in FIG. 3B. FIG. 3C illustrates the bracket welded as in FIG. 3B and having a wooden element 303 in place.

One piece of membrane material may support more than one and different types of brackets in a same assembly. The thickness C of piece 301 may be the same as or different from the thickness of the roofing membrane sheeting without departing from the spirit and scope of the invention. In a typical application support pieces may be cut from the same roofing materials used to cover the roof. Also, the length A and width B of piece 301 are sufficiently greater that the footprint of the bracket to allow for a lifting edges to be able to heat the underside of piece 301 and the membrane roofing to which it is being heat welded.

FIG. 4 is a perspective view of a fixture bracket 400, which is a low profile bracket that designed for holding a rail that may be slid in underneath two or more brackets in an array. Such rails are, for example, support for solar panels in some circumstances. Brackets 400 are in this example made from pre-treated galvanized sheets as described above. In this example, bracket 400 has two parallel tabs or wings (401, 402) lying in the same plane and a raised middle section 403. Bracket 400 with a number of similar brackets may be heat welded in an array to a long piece of membrane material, as shown, that may then be heat welded to the finished roof covering as depicted in FIG. 5 of this specification.

FIG. 5 is a perspective view of an assembly 500 hosting an array of fixture brackets 400 heat welded to one long piece of membrane material 501. Assembly 500 comprises an array of low profile brackets 400 heat-welded in an array to membrane material 501. In this configuration, the brackets are designed to enclose a rail foot (not illustrated) of a solar panel apparatus or other roof top equipment. Sufficient membrane material 501 is used such that the assembly is flexible, and may be manipulated to efficiently heat weld to a membrane roof.

Support piece 501 may be cut from the roofing sheet and may be longer and considerably wider than the profile of the bracket array to allow for more heat weld surface. In an implementation such as this one, a user may slip a rail underneath the heat-welded brackets and then bolt the utility to the rail. There can be more than one of these support pieces, such as for a utility having two or more rails for example. Brackets may be provided in various differing configurations without departing from the spirit and scope of the invention.

In general implementation where more than one support piece of membrane material may be used, an installer may outline one or more footprint areas on an unfinished roof surface where fixtures are to be installed on the finished roof. The demarcations may be part of a drawing or blueprint with dimensions so they may again be located after the roofing material is laid out. At the outlined locations, the installer may fasten, such as by roof stapling, one or more than one precut membrane pieces to the unfinished roof prior to laying out the strips or rolls of membrane to form the membrane roof. The installer may then position and secure the roofing sheets over the unfinished roof and the added support pieces. The installer may use fasteners and heat welding to secure the membrane roof system over the unfinished roof.

It may be assumed that in one implementation the fixture brackets are formed from commercially-available metal sheets pre-coated with the membrane material. The installer may arrange the brackets and heat weld them to additional precut pieces of membrane. These support pieces may be heat welded to the finished roof at demarked support locations where underlying support pieces exist or at any location desired if an underlying support is not required for the type of and weight of the fixture. The installer then fastens the fixtures to the brackets.

Reasons for adding underlying support may vary according to the angle of roof surface and the type and weight of the supported fixture or utility. For example, something heavy on a horizontal surface or vertical surface may need extra support. Very lightweight fixtures such as conduit hangars for example might be installed anywhere on the finished roof as needed. In one implementation certain lightweight fixtures may be packaged with brackets already heat welded to cut membrane pieces that are compatible with (can be heat welded to) the standard roofing materials. In this case users may add aftermarket fixtures to upgrade lighting or other features on the roof. The heat welding process itself is known in the art and available for use in fusing the materials together in a secure and leak proof fashion.

Figure 6:
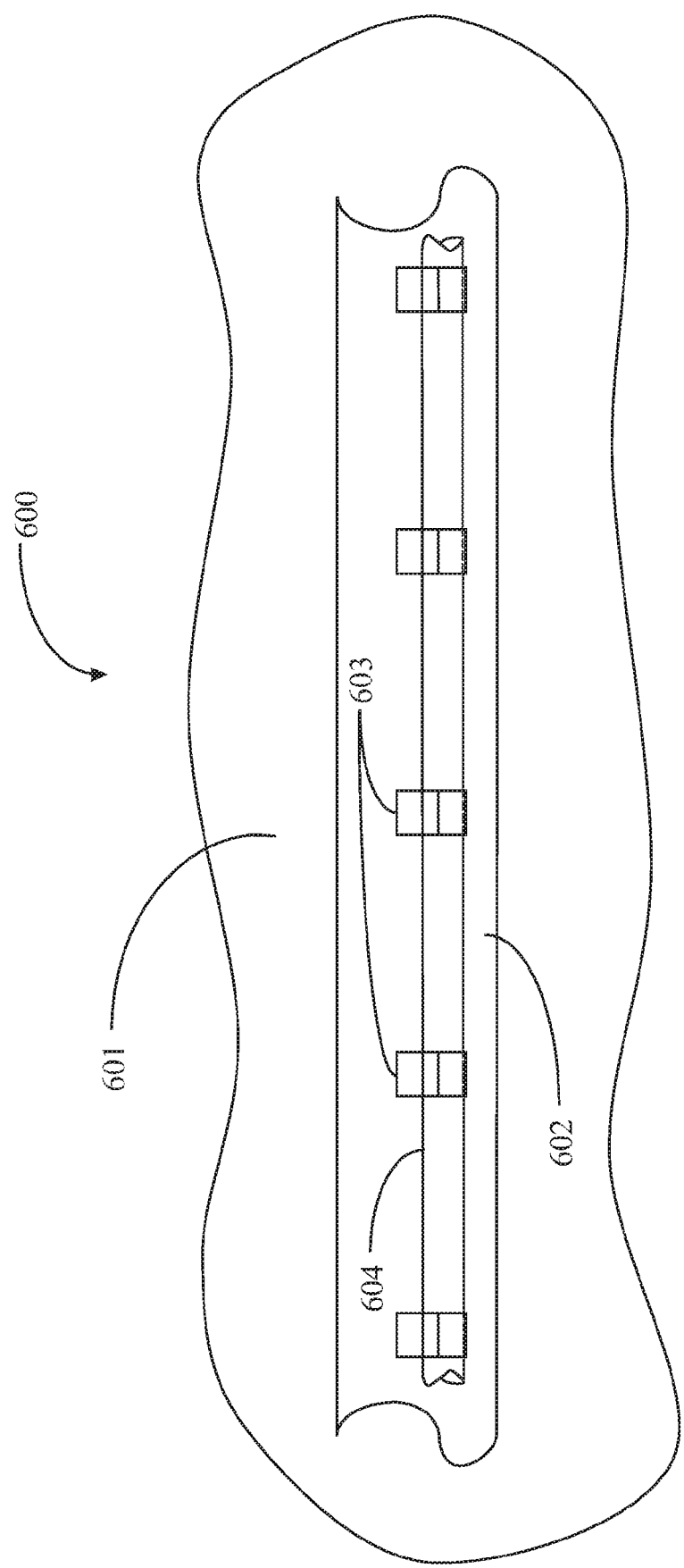
FIG. 6 is an expanded view of a vertically mounted conduit support structure according to an embodiment of the present invention.

FIG. 6 is an expanded view of a vertically mountable conduit support structure 600 according to an embodiment of the present invention. Structure 600 has a number of conduit support hangars (brackets) 603 that are designed to hold conduit on a vertical surface. Brackets 603 are formed, as described before, from commercially-available metal sheet pre-coated with compatible membrane material. Several brackets 603 are depicted as heat welded to a piece of precut membrane material 602.

The support apparatus (brackets heat welded to material) is heat welded to a finished vertical roof surface. Piece 602 may be as long as is required to span the length of the conduit to be mounted on the roof surface. In some implementation such as one depicted in the illustration of FIG. 1, two or more standard length support pieces (each hosting several conduit hangars) might be used collectively to hang the conduit. Many other fixture types may be installed to the finished membrane roof using the method of the present invention.

Figure 7:
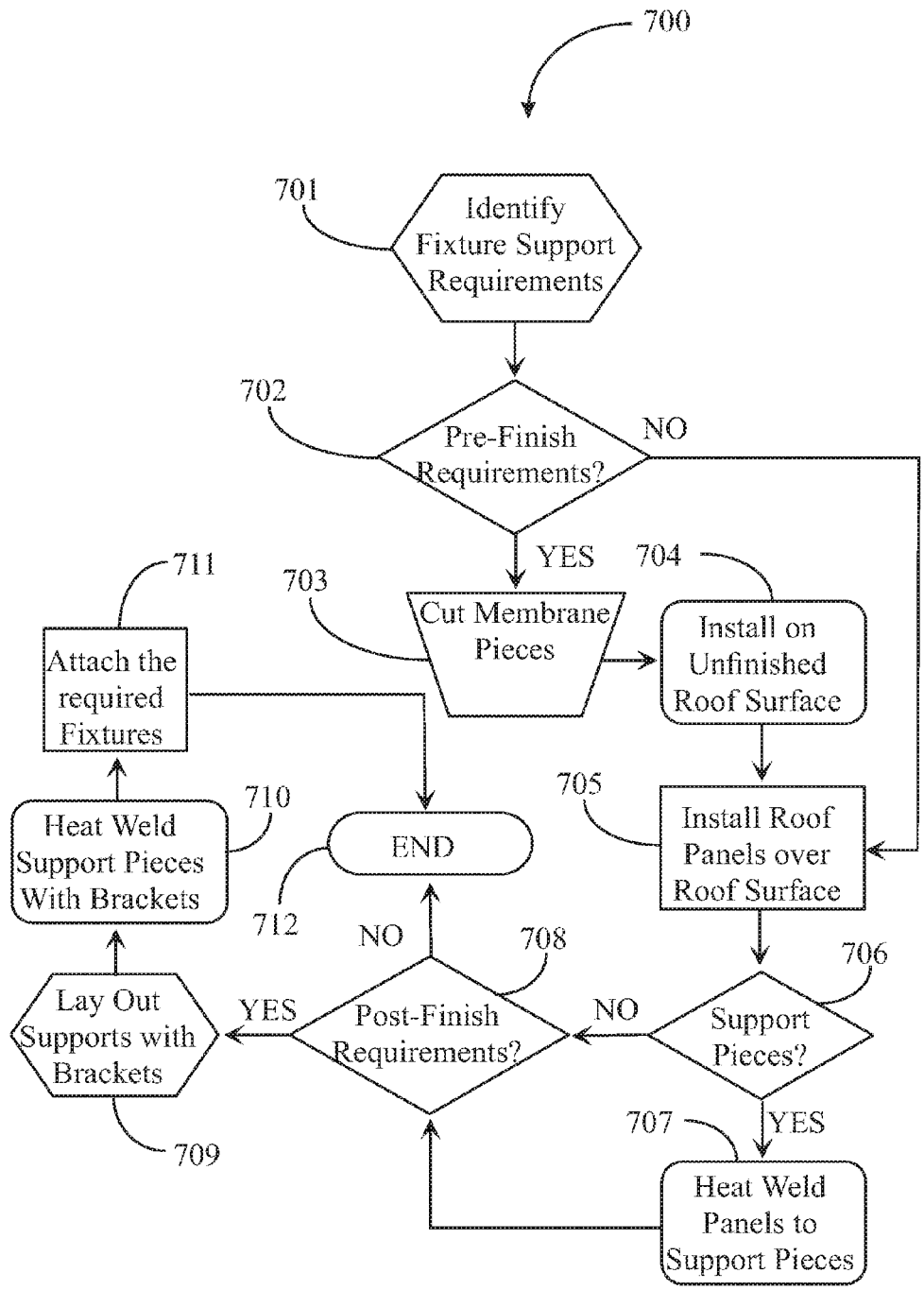
FIG. 7 is a process flow chart depicting steps for preparing a membrane roof system for fixture support or attachment according to aspects of the present invention.

FIG. 7 is a process flow chart 700 depicting steps for preparing a membrane roof system according to aspects of the present invention. In act 701 requirements are identified before roofing is applied to an unfinished roof. In this step the types of fixtures are identified and whether they need to be installed in certain areas on the roof, etc.

At step 702 it is determined if there are any pre-finish requirements relative to any of the fixtures identified in step 701. If there are pre-finish requirements at step 701 then the installer may precut pieces of the membrane sheeting material as required in step 703 to make the underlying membrane support areas. Any underlying pieces may be stapled or otherwise fastened to the unfinished roof at step 704. Underlying membrane support pieces may be installed on any angle of surface from horizontal to vertical.

If it is determined that there are no pre-finish requirements at step 702, the process may skip over to step 705 where the roof installation takes place. Likewise, conventional fasteners may be used to fasten one side of a roof sheet to the roof. Adjacent roofing sheets or panels are heat welded to the installed panels so only one side of a roofing sheet has to be fastened to the unfinished roof. An unfastened edge of a membrane roofing sheet is heat welded over a fastened edge of the previously installed sheet. The opposite edge of the heat-welded sheet may then be fastened to the unfinished roof.

At step 706 it is determined if there were support pieces attached to the roof as per step 704. If it is determined that there are pre-finish membrane support pieces on the roof the installer heat welds the roofing sheets to those support pieces wherever they occur in step 707. From either step 707 or step 706 in case of "no", it is determined whether there are any post-finish requirements (fixtures not requiring pre-finish support pieces) for attaching fixtures.

If it is determined that there are no post-finish requirements at step 708, then the process may end at step 711. If it is determined that there are post-finish requirements at step 708 the installer may lay out precut support pieces with the appropriate brackets heat-welded to those pieces at step 709. It may be assumed that the brackets are already heat-welded to the precut membrane pieces in the correct orientation to mount or otherwise connect the fixtures to the brackets. If this is not the case, additional steps for orientating the brackets and heat welding them to the pre-cut membrane support pieces may be required. For pieces containing multiple brackets, jigs or fixtures might be provided to help orientate those brackets for heat welding.

At step 710 the installer heat-welds the support pieces with the brackets attached to the finished roof at the pre-planned or desired locations. Fixture attachment to the brackets may also be performed at step 711 after the support pieces are finished and attached to the finished roof. The process may then end at step 712.

Figure 8:
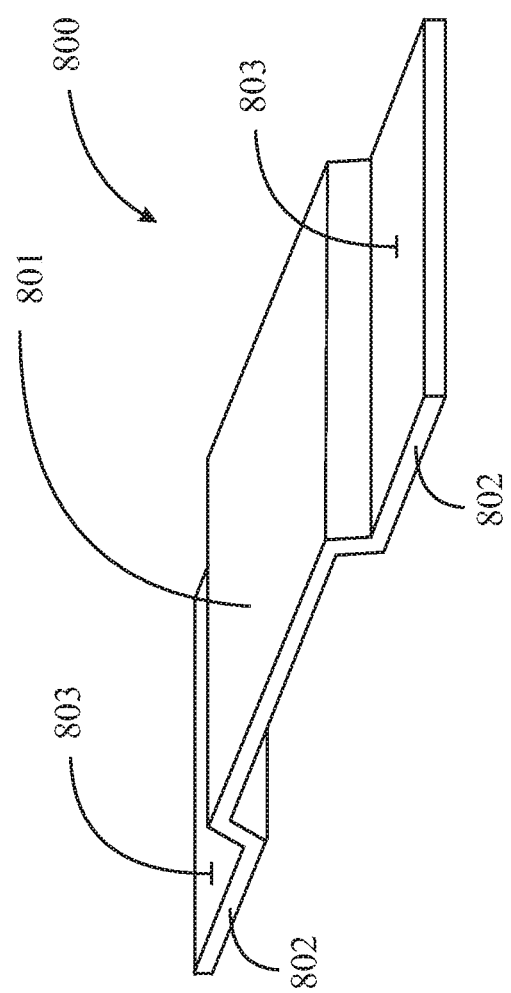
FIG. 8 is a perspective view of a bracket as used in an embodiment of the invention.

FIG. 8 is a perspective view of a bracket 800 as used in an embodiment of the invention. Bracket 800 is analogous to bracket 400 of FIG. 4_5 described above. Bracket 800 has a raised portion 801 and two parallel wings 802, also analogous to elements of bracket 400 described previously. The wings are provided to be adhered to a membrane roof, such that the raised portion 801 may be used to span a rail or some other element of a fixture or appliance to be mounted on a membrane roof. As described above for brackets 400, a plurality of such brackets may be adhered to a roof in a pattern to match a pattern of interface elements of the fixture or appliance to be mounted to the roof.

In the above description of the use of brackets 400 it is described that the bottom surface of wings 401 and 402 is coated with a material that is compatible for heat welding to a transition membrane (see element 501 in FIG. 4-5) that may subsequently be heat welded to the in-place membrane of an existing membrane roof. In implementation of brackets 800 the upper surfaces 803 of wings 802 are coated with the material compatible for heat welding to the transition membrane, rather than the bottom surfaces of the wings.

FIG. 9a is a perspective view of a transition membrane 901, having a length and width that is substantially greater than the area defined by three brackets shown in a straight-line pattern in FIG. 9b. Transition membrane 901 has three rectangular cut-outs 902 in this example, each cut-out of a length and width to correspond to the length and width of just a raised portion of a bracket 800. Transition membrane 901 is provided for joining brackets to a roof membrane in an embodiment of the invention. FIG. 9b shows a plurality of brackets 800, three in this example, with compatible heat-weld coating on upper surfaces of the wings, arrayed in a straight-line pattern. The three brackets are shown resting on a surface 900 of membrane of an existing membrane roof, but are not fastened or heat-welded to the membrane 900 of the membrane roof.

FIG. 10 shows the membrane 900 of the membrane roof, the three brackets 800 resting on that membrane, and transition membrane 901 lowered over the brackets 800 to cover the wings of each bracket and to rest on the membrane 900 of the membrane roof, leaving the raised portions 801 of each bracket protruding above the upper surface of the transition membrane 901. After positioning over the brackets, transition membrane 901 is heat welded to the coated upper surfaces of the wings of all the brackets, now beneath the transition membrane, and thus shown as dotted lines, and also to the membrane 900 of the membrane roof, being careful to accomplish heat welding between the transition membrane and the membrane of the membrane roof all around each bracket and fully out to the borders of the transition membrane.

The arrangement in this embodiment of the invention provides a moisture-proof seal around the brackets, and provides a stronger bond between the brackets and the membrane roof than the previously described embodiment wherein the brackets are coated on the bottom surfaces of the wings of the brackets, and the brackets are heat welded to a top surface of the transition membrane.

The skilled person will understand that the form of the brackets shown in this example is exemplary, and that the raised portion may take a variety of different forms, according to need of interface hardware of apparatus, such as appliances, that may need to be secured to a membrane-covered roof. The skilled person will also understand that the pattern of placement of the brackets is depended upon the need dictated by the interface hardware of an appliance to be mounted on the membrane roof, and the pattern may take a variety of geometric forms. What is essential is that there be parallel wings that may be coated on an upper surface and caused to be captured beneath a transition membrane as described above.

FIG. 11a is a perspective view of a bracket 1102 used according to a variation of the embodiment of FIGS. 8 through 10. Bracket 1102 is analogous to bracket 800 of FIG. 8. Bracket 1102 may be of another form and design without departing from the spirit and scope of the present invention. Bracket 1102 includes a raised central portion (surface) 1106, and wings 1103 having the upper surfaces thereof coated with a roof membrane compatible heat-weld induction material rather than the bottom surfaces as previously described.

In this example, shown in FIG. 11a, separate cut sections 1104 and 1105 of a transition membrane are provided to be heat-welded to the coated upper surfaces of wings 1103 rather than using a single transition membrane having cut-outs for the raised portions of the brackets such as membrane 901 of FIG. 9a. The transition membrane sections 1104 and 1105 have a length and width dimension that is greater than the defined area of wing 1103 such that they each may overlap the wing portions of the bracket. It is noted herein that the shape or form of transition membrane sections 1104 and 1105 may vary widely depending upon the design of the bracket used. Bracket 1102 depicts one such design example. FIG. 11b illustrates a roof membrane 1100 to which bracket 1102 is joined.

In this example, separate cut sections 1104 and 1105 of a transition membrane are provided to be heat-welded to the coated upper surfaces of wings 1103 rather than using a single transition membrane having cut-outs for the raised portions of the brackets such as membrane 901 of FIG. 9. The transition membrane sections 1104 and 1105 have a length and width dimension that is greater than the defined area of wing 1103 such that they each may overlap the wing portions of the bracket. It is noted herein that the shape or form of transition membrane sections 1104 and 1105 may vary widely depending upon the design of the bracket used. Bracket 1102 depicts one such design example.

Figure 12:
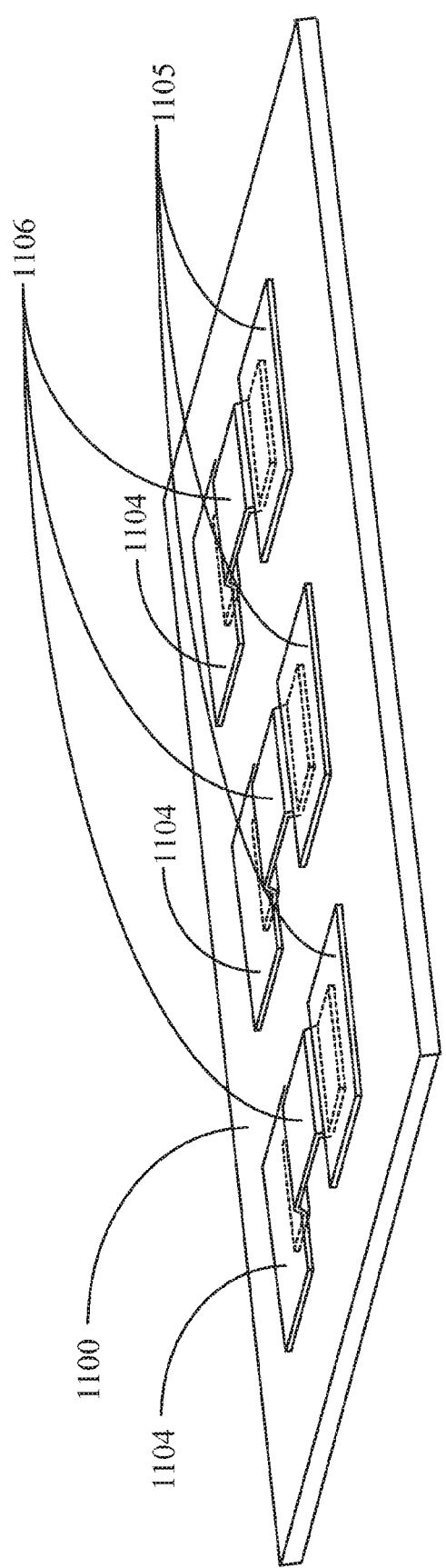
FIG. 12 is a perspective view of a plurality of brackets analogous to bracket 1102 of FIG. 10 arranged in a pattern and welded to a roof membrane.

FIG. 12 is a perspective view of a plurality of brackets analogous to bracket 1102 of FIG. 10 arranged in a pattern and welded to roof membrane 1100. In this example, multiple brackets are laid on roof membrane 1100 in a strategic pattern. Transition membrane sections 1104 and 1105 are heat welded to the roof membrane over the bracket wings. They are also welded onto the bracket wings at the upper surfaces thereof (wings depicted in broken boundary). The transition membrane sections have a thickness dimension smaller than the height from the upper wing surface to the exposed central portion of the bracket.

In one embodiment single brackets (1102) may be prepared for roof weld separately by application of the induction weld-compatible material to the upper surfaces of the wings. The brackets may be welded to the transition membrane sections at the upper surfaces of the bracket wings. Such prepared brackets may be collectively stored and brought out to a roofing construction or repair site when needed. In this example, there are three brackets secured onto roof membrane 1100 using transition membrane sections 1104 and 1105, however there may be fewer brackets or more brackets welded onto roof membrane 1100 using one or more sections of transition membrane without departing from the spirit and scope of the present invention.

Figure 13:
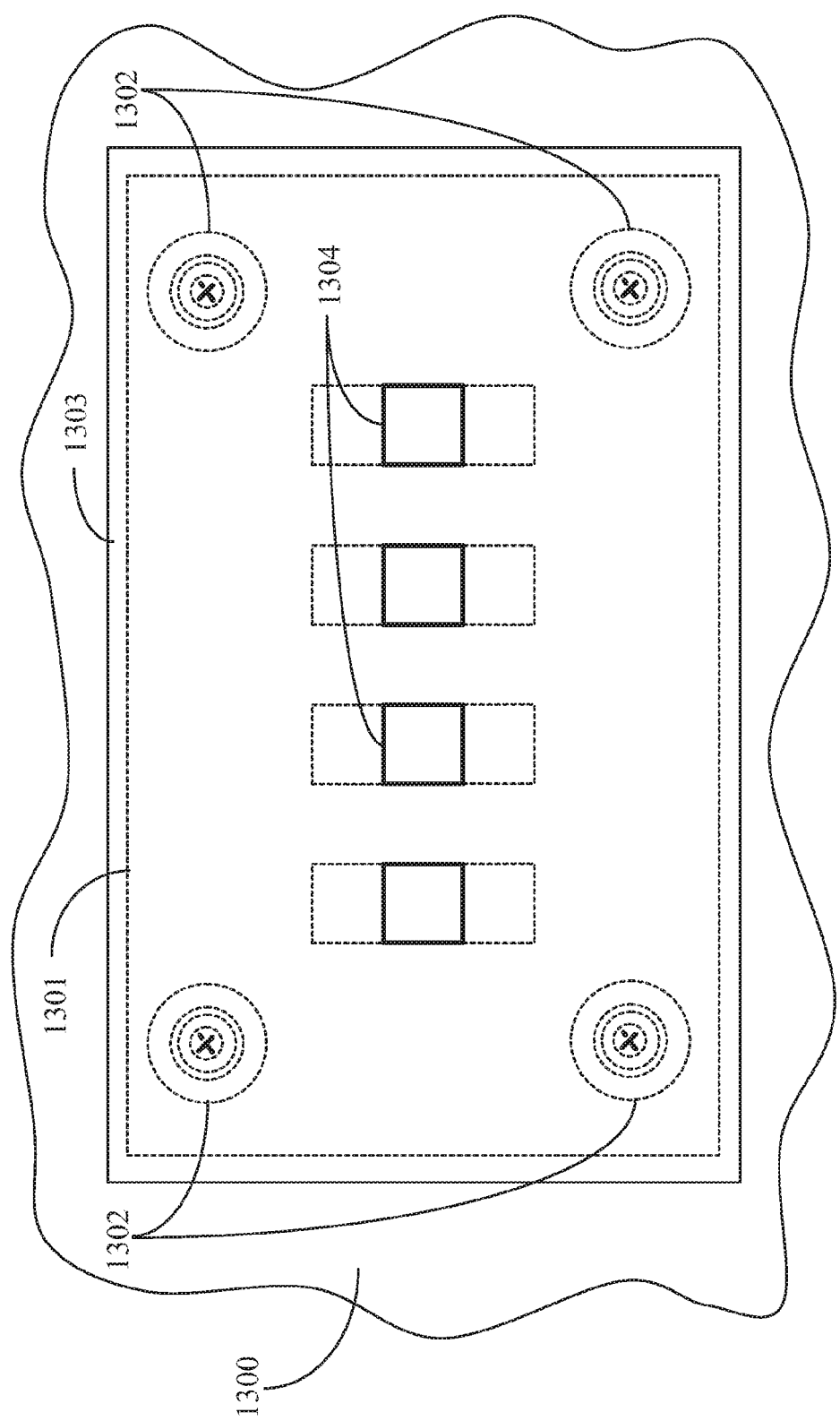
FIG. 13 is an overhead view of an installation using a first and second transition membrane and a plurality of metal plates with fasteners for reinforcement of bracket stability according to an embodiment of the invention.

FIG. 13 is an overhead view of a reinforced bracket installation according to another embodiment of the invention. In this example a first transition membrane 1301 may be laid over roofing membrane 1300, and may be anchored in place using metal discs or plates 1302 with openings for fasteners such as nails or screws that may be inserted there through and may penetrate into the roof decking below the roofing membrane.

Plates 1302 are annular in this embodiment however other shapes may be utilized such as common geometric shapes and custom shapes for some installations depending upon the appliance and fixtures that will be mounted. In one embodiment plates 1302 include downward facing barbs to stick into to the surface of first membrane 1301. In this example screws are used to anchor plates 1302 securing first membrane 1301 to roof membrane 1300 and into the wood decking below. Plates 1302 may be placed in a strategic pattern and there may be more or fewer plates 1302 securing first membrane 1301 to roof membrane 1300 and the underlying deck than are illustrated in this example.

The upper surface area of plates 1302 may be coated with a compatible induction heat-weld coating in one embodiment either before, or after the fasteners are inserted and driven down into the decking. Anchoring of a first transition membrane in this fashion provides more thickness (roof membrane, first transition membrane) at the base of a future fixture installation thereby increasing its stability.

A plurality of brackets analogous to the brackets (1102) of FIGS. 11 and 12 having induction heat-weld compatible material coated on the upper surfaces of the bracket wings are depicted welded to a second transition membrane 1303 in the fashion described further above relative to FIG. 12. This bracket assembly may be prefabricated and brought to the roof site. The second transition membrane 1303 has a width and length overlapping the boundaries of the first membrane and anchor positions (plates 1302).

In this example, transition membrane 1303 has a pattern of cutouts adapted to fit over the raised portions 1304 of the brackets and the wings of the brackets have heat-weld coating on the upper surfaces thereof. However, both interfacing surfaces of the brackets may be so coated without departing from the spirit and scope of the present invention. In this embodiment the second transition membrane supporting the bracket pattern is laid over the first transition membrane wherein the second membrane overlaps the first membrane in overlay. A heat induction welder may be used to weld the second transition membrane to the first transition membrane and to the roofing membrane covering the first transition membrane and the anchor positions completely in overlap fashion.

In this embodiment the second transition membrane may comprise of more than one separate section without departing from the spirit and scope of the invention, the aggregate thereof having the overall dimensioning required to cover the first transition membrane and the anchor positions. In this example, the transition membranes used are rectangular sections however other geometric and custom shapes may be fabricated or cut from a larger section without departing from the spirit and scope of the present invention. The fixture or appliance may be mounted to the exposed surfaces of the metal brackets. This reinforced installation may be implemented using single brackets or multiple brackets arranged in a pattern.

Figure 14:
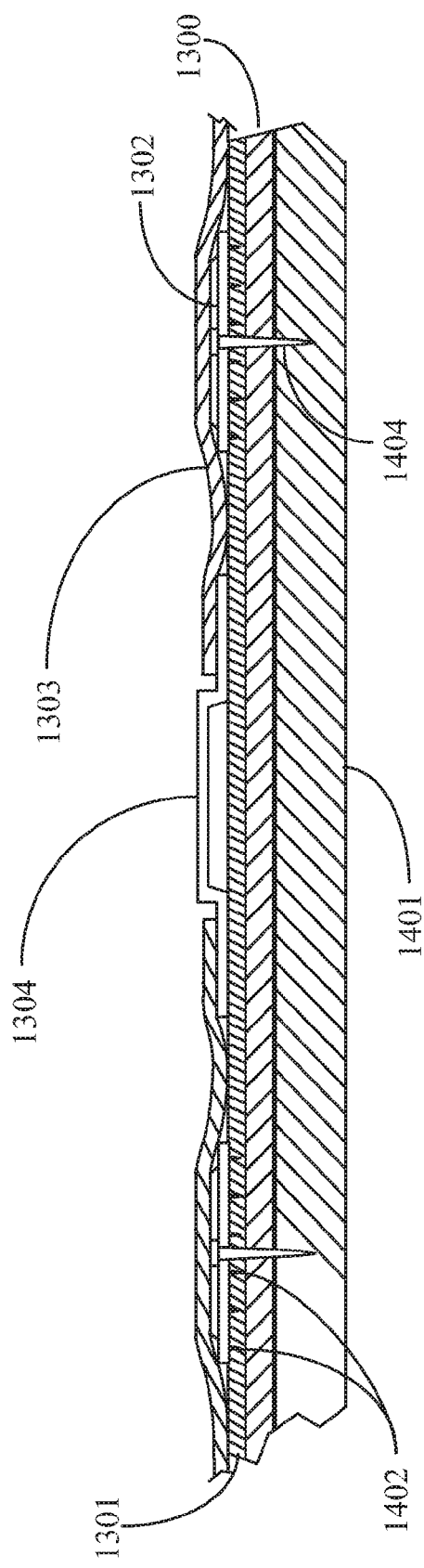
FIG. 14 is a sectioned elevation view of the installation of FIG. 13.

FIG. 14 is sectioned elevation view of the reinforced installation of FIG. 13. In this view a roofing underlay or decking material 1401 is depicted with roof membrane 1300 installed there over. In this example first transition membrane 1301 is laid over roof membrane 1300 and anchored to the roof using metal plates 1302 with fasteners 1404 penetrating through roofing membrane 1300 and into decking 1401.

In one embodiment first transition membrane 1301 is anchored and induction heat welded to roofing membrane 1300. In another embodiment it is simply anchored in place using fasteners 1404. In one embodiment plates 1302 include a plurality downward facing barbs 1402 to aid in gripping the membrane at the desired anchoring position for each plate. In one implementation the upper surfaces of plates 1302 are coated with an induction heat weld material compatible with the transition membrane material.

In this implementation, plates 1302 rest on top of first transition layer and anchor it down tightly. The transition layer may also be heat welded directly to roofing membrane 1300 to further strengthen the base facility for a future fixture or appliance. A bracket analogous to bracket 800 of FIG. 8 above is depicted welded to second transition layer 1303. In this implementation the bracket is welded to the second transition layer at the upper coated surfaces of the bracket wings. In another implementation the bracket may be heat welded to the second transition membrane at the downward facing surfaces of the bracket wings. In one embodiment, there is a single bracket welded to second transition membrane 1303. In another implementation such as depicted above in FIG. 13, there is strategic a line of two or more brackets or a distributed pattern of brackets arrayed in some geometric pattern.

Upper and centrally exposed bracket surface 1304 is a mounting location for a fixture or appliance. As previously described, the assembly including the bracket and the second transition membrane may be prefabricated, stored for later use, and brought to the site when the appliance install phase of a roofing operation is in progress or about to begin.

In this example, second transition membrane 1303 supporting the bracket or pattern or line of brackets is overlaid onto the anchored first transition membrane such that the perimeter boundaries of the second transition layer overlap the boundaries of the first transition membrane with a margin of extension out onto the roof membrane in both length and width dimensions. Second transition membrane 1303 may be induction heat welded to first transition membrane 1301 and to the upper surfaces of plates 1302 thereby sealing off the anchor points from exposure to weather.

Figure 15:
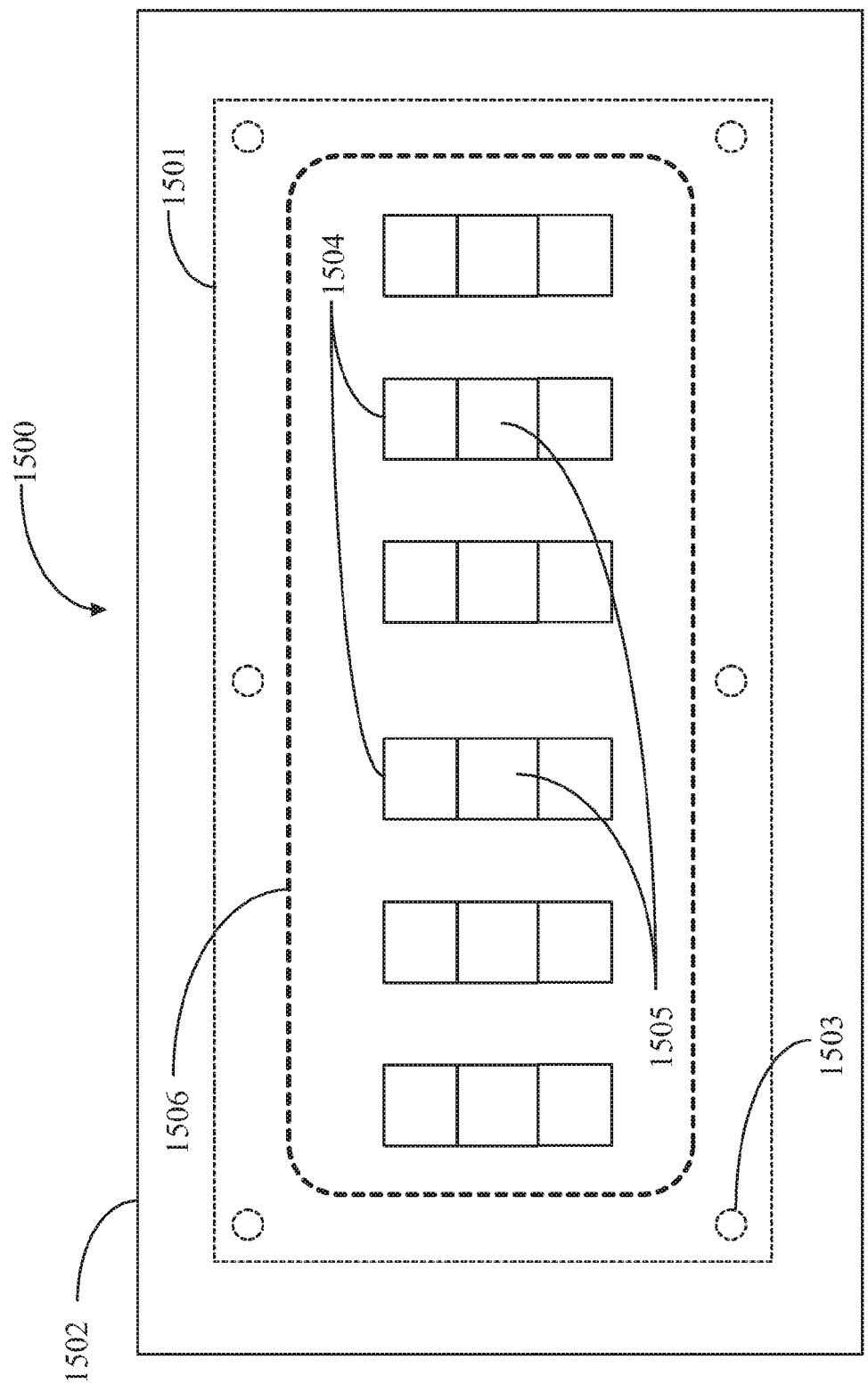
FIG. 15 is an overhead view of a bracketed roof installation according to another embodiment of the present invention.

FIG. 15 is an overhead view of a bracketed roof installation 1500 according to another embodiment of the present invention. In one embodiment maximum reinforcement may be desired for holding particularly heavy objects, appliances, or fixtures in p-lace on a rooftop.

A bracketed roof installation module 1500 includes a metal plate 1502 such as a stainless steel plate having a length, a width, and a thickness dimension. Plate 1502 has a hole or bolt pattern of openings 1503 placed strategically about the plate in a rectangular pattern. Openings 1503 are intended to accept fasteners for bolting plate 1502 down onto a roof membrane. Plate 1501 has an induction-weld-compatible material coating on the upper surface thereof for heat welding transition membrane 1502 to the surface of the metal plate. It is noted herein that the induction weld area of membrane to plate is depicted as boundary 1506.

Boundary 1506 is short of the area of bolt openings 1503 so that an installer may peel back the membrane to expose openings 1503 so fasteners may be inserted there through and driven down into the roof at a strategic location. Modular installation 1500 may be fabricated off site and then brought to the roof location for installation. There may be one or many such installations and they may have different forms, shapes and functions in the field pertinent to what fixtures or appliances they are intended to facilitate the mounting of.

A plurality of brackets having wings 1504 and upper mounting surfaces 1505 are depicted in a strategic linear arrangement and welded down onto a transition membrane 1502. The transition membrane supporting the brackets may then be welded onto plate 1501. Transition membrane 1502 significantly overlaps plate 1501 in length and in width so that the entire assembly may be induction heat welded to a roof membrane.

Figure 16A:
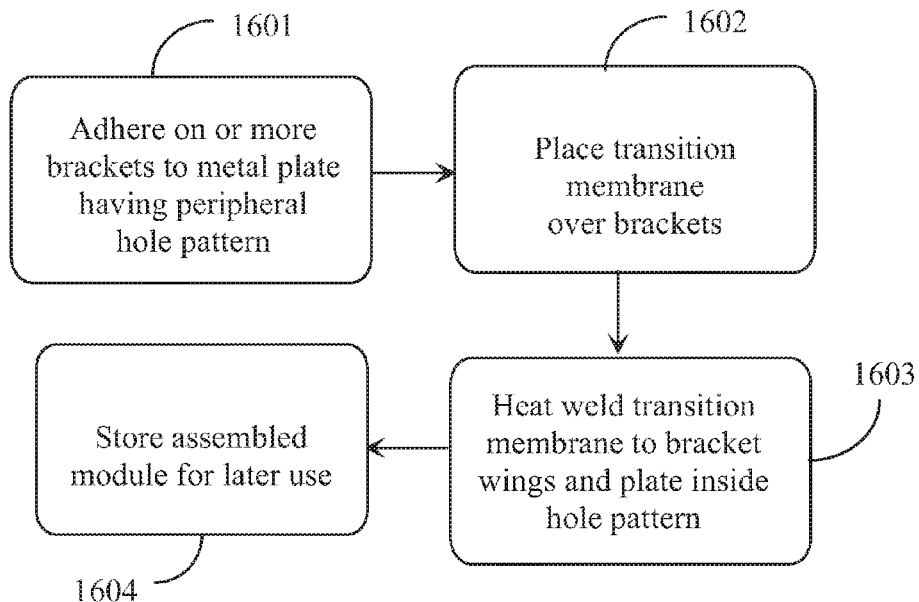
FIG. 16 is a process flow chart depicting steps for fabricating and installing the modular bracket roof installation of FIG. 15.
Figure 16B:
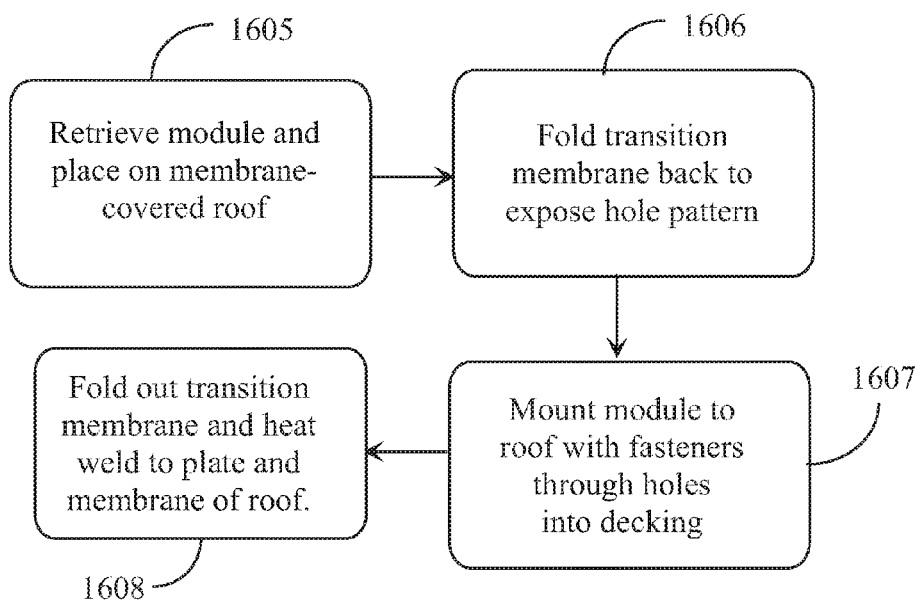

FIG. 16 is a process flow chart 1600 depicting steps for fabricating and installing the modular bracket roof installation of FIG. 15. At step 1601 a user may coat brackets with induction weld material that is compatible with the membrane material used on the roof and the transition membrane material used. In this step the user may coat just the bottom surfaces of the wings of the bracket or just the top wing surfaces, or both wing surfaces.

At step 1602, the user may arrange the brackets, or a single bracket (one embodiment) on a transition membrane and induction heat weld them to the membrane. The brackets may be welded to the membrane at the upper wing surfaces or at the lower wing surfaces, the transition membrane may be one piece with cutouts for the raised portions of the brackets to stick through.

At step 1604 the user may weld the transition membrane supporting the brackets to a plate analogous to plate 1502 of FIG. 5. The plate in this case may be coated with heat weld material on the upper surface. Also in step 1604, the area of the weld falls short of the bolt openings. At this stage in process 1600, the apparatus (roof mounting assembly) may be stored for later use. A user may fabricate several assemblies using steps 1601 through 1604.

At step 1607 a user may determine if one or more of the fabricated assemblies will be used at a job site. If it is determined not to use one or more assemblies at step 1607, the process may resolve back to step 1605. If one or more assemblies are to be used at step 1607, the user may take one or more to a job site and locate and place the assembly or assemblies on the roof for installation. At step 1609, the user may pull back on membrane to expose the plate openings that receive the fasteners. At step 1610 the user may install the assemblies to the roof using fasteners such as nails or screws. Steps 1609 and 1610 may be repeated for each installation.

At step 1611, the user may heat weld the overlapping transition membrane directly to the roof membrane covering the bolt pattern and the edges of the plate. The hardware is completely covered save for the raised surfaces of the brackets intended to interface with mounted items fixtures or appliances. The process may end at step 1612.

Figure 17:
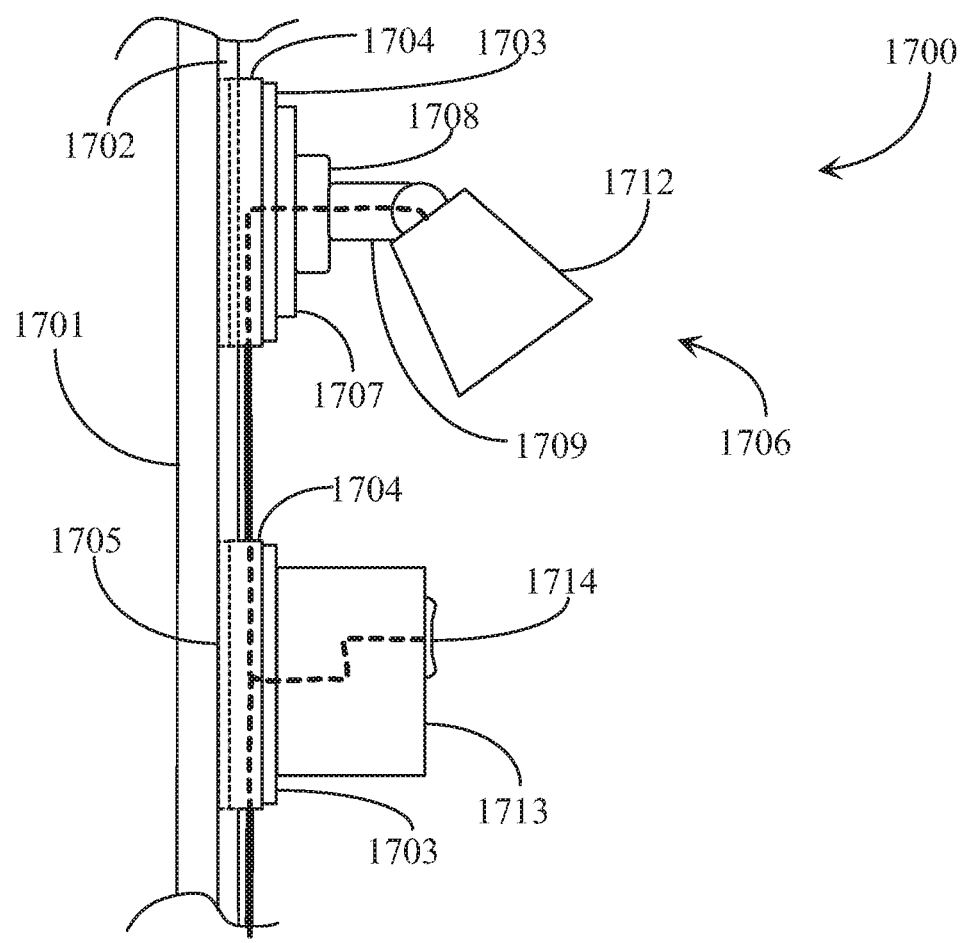
FIG. 17 is a side view of a vertically-oriented roof illustration according to another embodiment of the present invention.

FIG. 17 is a side view of a vertically-oriented roof illustration 1700 according to another embodiment of the present invention. Installation 1700 comprises a work light or motion sensor 1706 and a control box 1713 with a switch 1714. A roof membrane 1701 is depicted in a vertical position representing a portion of a roof system that covers a vertical wall. A first transition membrane 1702 is depicted overlaid on to roof membrane 1701. Transition membrane 1702 supports two brackets 1704 (same element number for identical brackets) welded thereto as described further above wherein the upper surfaces of the bracket wings 1705 are coated with material to facilitate heat welding to membrane.

Light fixture 1706 includes a base plate 1707 having a relatively flat interfacing surface to the upper surface of bracket 1704. In this example a second transition membrane 1703 is welded to the exposed (coated) surface of bracket 1704. Base plate 1707 may be welded to the remaining surface of membrane 1703, obfuscating any need for fastening hardware to fasten the fixture onto the bracket. In this case light fixture 1706 is supported on bracket 1704 by second transition membrane 1703. Likewise, no hardware is required to attach the brackets to roof membrane 1701 as the first transition membrane, in this case transition membrane 1702 supports the brackets and is heat welded to the roof membrane. Light fixture 1706 includes a ball stem mount 1709, a mounting hub 1708 fixed to base plate or mounting plate 1707, and a light shade or direction device 1712 that may be pivoted and fixed at varying angles.

Control box 1713 may be heat welded to second transition membrane 1703 (same element number for identical parts). Control box 1713 is coated with a heat weld material compatible to second transition membrane 1703. Brackets 1704 may also support a wiring running to the control box and to the light fixture. In this case brackets 1704 have openings for wiring as well as the second membrane and fixture hardware.

In one embodiment of the present invention brackets such as the brackets described in this specification may be mechanically bridged using rails, plates, or other structures, such structures supported on the roof via brackets and providing further mounting area for other fixtures, lines, cables, or appliances.

Figure 18:
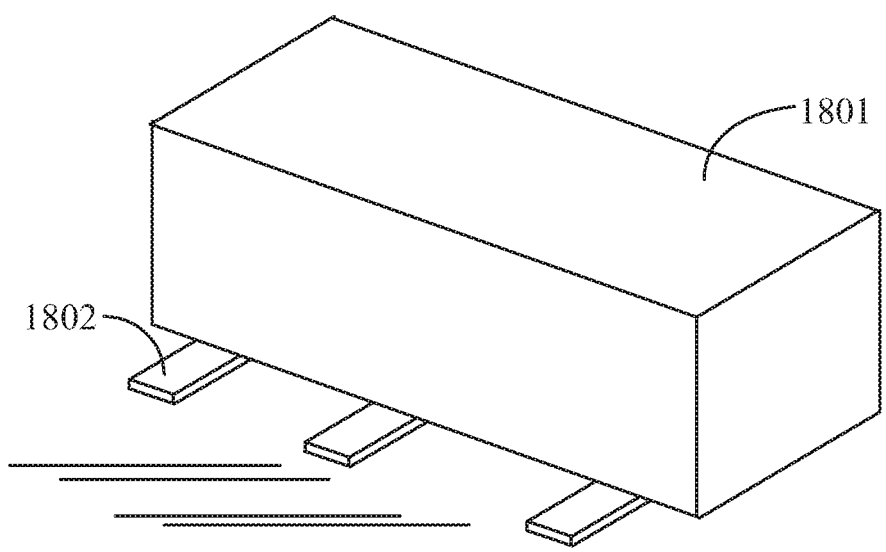
FIG. 18 is a perspective view of an appliance mounted on rails to be mounted to a membrane-covered roof.

FIG. 18 is an elevation view of an appliance, machine, enclosure, or other object 1801 that one might wish to anchor securely on a membrane-covered roof. In many circumstances objects to be mounted may not have suitable attachment hardware, like legs with mounting feet, and one may need to improvise. In this case object 1801 is first mounted to rails 1802, which may be mounted in any one of a variety of ways to the object. Rails 1802 may be metal rails or rods, or beams of various sorts of material, except weatherproof materials are preferred. The rails provide a convenient interface for mounting to the membrane-covered roof.

Figure 19:
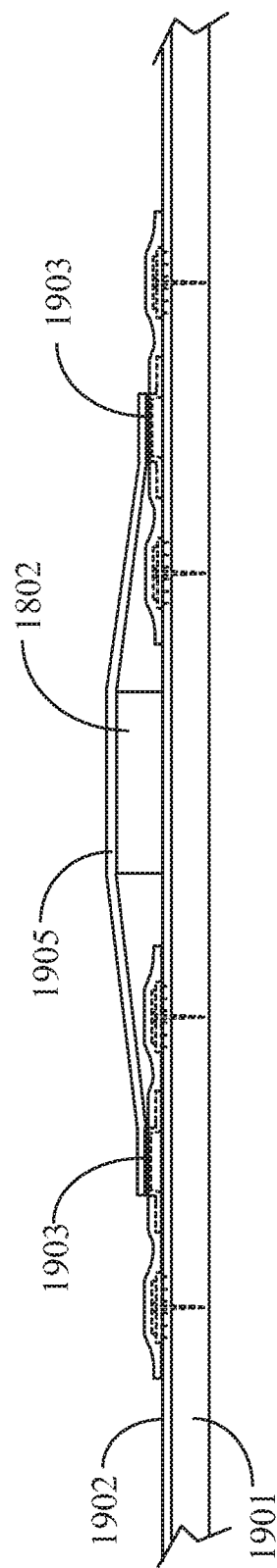
FIG. 19 illustrates a method for bridging between attachment points to secure rails or appendages to a membrane-covered roof.

FIG. 19 is an elevation view of two attachment units mounted to the membrane-covered roof according to FIG. 12, 13, 14 or 15 described above, which in most cases include at least one metal plate fastened through the membrane of the membrane-covered roof, and itself covered with a transition membrane to preclude any leak paths into the decking under the membrane. In these attachments typically a raised portion of a bracket 1903, analogous to brackets 1302 is exposed. In FIG. 19 the membrane of the membrane-covered roof is membrane 1902 and the decking beneath is 1901. The attachments providing metal brackets 1903 are according to FIG. 14, and the description of FIG. 14 above. The attachments might, however be according to one of FIG. 12, 13 or 15.

In an embodiment of the invention, the attachments providing brackets 1903 are placed and installed where needed to provide anchor points for rail 1802. With the anchor points in place one may bridge between the anchor points to secure rail 1802 to the surface of the roof, providing one secure attachment for appliance 1801 in FIG. 18. In FIG. 18 a metal bridge 1905 has been fabricated and used to bridge between the two installed attachments having brackets 1903, and may be fastened to the brackets and to rail 1802 in a number of different ways.

In another embodiment bridging may be done in other ways, for example one might bridge strips of membrane between the attachment points and heat weld the membrane to the attachment points and to the rail. In the use of membrane for bridging the attachment points would typically be placed closer to the rail and membrane may be stretched over the rail and directly down to transition membrane over the attachment points, and be heat welded to the attachment points.

The skilled person will realize that with rails provided to objects for attachment to membrane roofs, that there are a variety of ways the rails may be joined to the roof, especially reinforced attachments added at strategic points relative to known positions for mounting rails.

It will be apparent to one with skill in the art that the system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

The invention claimed is:

1. A method for mounting an appliance to a membrane-covered roof, comprising:
   (a) mounting two or more rails or appendages to the appliance, the rails or appendages placed to lie flat on the membrane-covered roof, supporting the appliance, and to extend away from the appliance;
   (b) installing two reinforced attachments, each incorporating a metal plate fastened into decking below the membrane of the membrane-covered roof, and covered by transition membrane heat welded to the membrane of the membrane-covered roof, one attachment installed on each side of each rail to be secured to the roof; and
   (c) fastening a bridge between the two attachments and over the rail at each rail point to be secured to the roof.

2. The method of claim 1 wherein the rails or appendages are metal rails.

3. The method of claim 1 wherein the bridge is formed of metal fastened to brackets at each of the attachment points.

4. The method of claim 1 wherein the bridge is formed of strips of membrane material heat welded to brackets at the attachments, and formed over the rails or appendages.

* * * * *